United States Patent
Darshan et al.

(10) Patent No.: US 7,756,201 B2
(45) Date of Patent: Jul. 13, 2010

(54) SYSTEM FOR RANDOM ACCESS TO CONTENT

(75) Inventors: Ezra Darshan, Beit Shemesh (IL); Colin John Davies, Hants (GB); Ian Bastable, Hampshire (GB)

(73) Assignee: NDS Limited, Middlesex (GB)

( * ) Notice: Subject to any disclaimer, the term of this patent is extended or adjusted under 35 U.S.C. 154(b) by 1647 days.

(21) Appl. No.: 10/479,373

(22) PCT Filed: Jun. 30, 2002

(86) PCT No.: PCT/IL02/00534

§ 371 (c)(1),
(2), (4) Date: May 12, 2004

(87) PCT Pub. No.: WO03/010970

PCT Pub. Date: Feb. 6, 2003

(65) Prior Publication Data

US 2004/0199658 A1        Oct. 7, 2004

Related U.S. Application Data

(60) Provisional application No. 60/308,076, filed on Jul. 26, 2001.

(30) Foreign Application Priority Data

Jul. 23, 2001    (GB) ..................... 0117926

(51) Int. Cl.
H04N 7/12 (2006.01)
H04N 11/02 (2006.01)
H04N 11/04 (2006.01)

(52) U.S. Cl. .......................... 375/240.01; 375/240.26; 375/240.28

(58) Field of Classification Search ............ 375/240.26, 375/240.28; 348/423.1
See application file for complete search history.

(56) References Cited

U.S. PATENT DOCUMENTS 5,237,593 A    8/1993    Fisher et al.
5,282,249 A    1/1994    Cohen (Continued)

FOREIGN PATENT DOCUMENTS

EP    0 712 127 A2    5/1996

(Continued)

OTHER PUBLICATIONS

Patent Abstracts of Japan; vol. 1998, No. 10, Aug. 31, 1998 & JP 10 145773 A (Toshiba Corp), May 29, 1998 *abstract* & US 6 021 199 A (Ishibashi Yasuhiro) Feb. 1, 2000.

(Continued)

*Primary Examiner*—Marsha D Banks Harold
*Assistant Examiner*—Chikaodili E Anyikire
(74) *Attorney, Agent, or Firm*—Husch Blackwell Sanders LLP Welsh & Katz

(57) ABSTRACT

A method for accessing a desired point in time-synchronized data within a stream, the stream being associated with time information, the method including providing a desired presentation time associated with a desired point within a time-synchronized data stream, determining a stream access point, decoding the stream beginning at the stream access point, and assigning a time associated with the stream access point as a utilization time. Related apparatus and methods are also disclosed.

38 Claims, 6 Drawing Sheets

U.S. PATENT DOCUMENTS

| | | | |
|---|---|---|---|
| 5,414,455 | A | 5/1995 | Hooper et al. |
| 5,455,684 | A | 10/1995 | Fujinami |
| 5,481,609 | A | 1/1996 | Cohen |
| 5,550,643 | A | 8/1996 | Azadegan |
| 5,559,608 | A | 9/1996 | Kunihiro et al. |
| 5,630,005 | A | 5/1997 | Ort |
| 5,659,539 | A * | 8/1997 | Porter et al. ............ 709/231 |
| 5,737,479 | A | 4/1998 | Fujinami et al. |
| 5,742,681 | A | 4/1998 | Giachetti et al. |
| 5,798,995 | A | 8/1998 | Fukushima et al. |
| 5,900,904 | A | 5/1999 | Okada et al. |
| 5,973,679 | A | 10/1999 | Abbott et al. |
| 6,021,199 | A | 2/2000 | Ishibashi et al. |
| 6,023,453 | A * | 2/2000 | Ruutu et al. ............ 370/229 |
| 6,026,232 | A | 2/2000 | Yogeshwar et al. |
| 6,154,496 | A * | 11/2000 | Radha .............. 375/240.28 |
| 6,177,928 | B1 * | 1/2001 | Basso et al. ............ 715/203 |
| 6,178,242 | B1 | 1/2001 | Tsuria |
| 6,233,389 | B1 | 5/2001 | Barton et al. |
| 6,453,115 | B1 | 9/2002 | Boyle |
| 6,512,882 | B1 | 1/2003 | Teunissen |
| 6,538,656 | B1 * | 3/2003 | Cheung et al. ............ 345/519 |
| 6,931,198 | B1 | 8/2005 | Hamada et al. |
| 2001/0000809 | A1 * | 5/2001 | Ando et al. ............ 707/100 |
| 2002/0135607 | A1 * | 9/2002 | Kato et al. ............ 345/716 |
| 2004/0004977 | A1 | 1/2004 | Robbins et al. |
| 2004/0170390 | A1 | 9/2004 | Kim et al. |

FOREIGN PATENT DOCUMENTS

| | | |
|---|---|---|
| EP | 0718980 | 6/1996 |
| EP | 0 964 578 B1 | 7/1996 |
| EP | 0 786 909 A2 | 1/1997 |
| EP | 1 039 750 A2 | 9/2000 |
| EP | 1 089 565 A2 | 9/2000 |
| JP | 60253026 | 12/1985 |
| JP | 03058131 | 3/1991 |
| JP | 04087074 | 3/1992 |
| JP | 04101244 | 4/1992 |
| JP | 04159662 | 6/1992 |
| JP | 06060120 | 3/1994 |
| JP | 06302112 | 10/1994 |
| JP | 07250331 | 9/1995 |
| JP | 08336111 | 12/1996 |
| JP | 09330257 | 12/1997 |
| JP | 10145773 | 5/1998 |
| WO | WO 99/46922 | 9/1999 |
| WO | WO-99/62251 A2 | 12/1999 |
| WO | WO-00/01149 A1 | 1/2000 |
| WO | WO-01/35669 A2 | 5/2001 |

OTHER PUBLICATIONS

International Organisation for Standardisation: "Generic Coding of Moving Pictures and Associated Audio: Systems, Recommendation H.222.0, ISO/IEC 13818-1, International Standard", ISO/IEC JTCI/SC29/WG11 N0801, XX, XX, pp. 1-161 XP002200170.

"Exact Random Access of Motion Picture Experts Group Files" IBM Technical Disclosure Bulletin, IBM Corp. New York, US, vol. 38, No. 12, Dec. 1, 1995, pp. 329-330, XP000588159.

Webpage: http://www.winternet.com/~gginc/ftp/isf110.txt, Oct. 4, 1999, pp. 1-5.

ISAM—AOL Computing's Webopedia Definition and Links, (http://aol.pcwebopedia.com/TERM/I/ISAM/html), Oct. 4, 1999, p. 1.

The Stony Brook Video Server—Implementation and Analysis of Fast Forward/Rewind for MPEG (http://www.ecsl.sc.sunysb.edu/~vernick/ffwd.html), pp. 1-5.

Taylor, Jim; DVD Demystified The Guidebook for DVD-Video and DVD-ROM, McGraw-Hill, 1998, pp. 72 and 195.

SMPTE Standard for Television—Splice Points for MPEG-2 Transport Streams, SMPTE 312M, 1999, pp. 1-20.

Syntax of a transmitted digital multimedia or other data signal, ISO/IEC 13818-1: 1994(E) pp. 22 and 121.

Digital Video Broadcasting (DVB); DVB SimulCrypt; Part 1: Head-end architecture and synchronization; TS 1-1 197-1 V1.1.1 (Jun. 1997).

ETSI Technical Report—"Digital Video Broadcasting (DVB); Support for use of scrambling and Conditional Access (CA) within digital broadcasting systems"; ETR 289, Oct. 1996.

MPEG-2 Standard; "Information technology—Generic coding of moving pictures and associated audio information: Video", ISO/IEC 13818-2:1996(E).

MPEG-2 Standard; "Information technology—Generic coding of moving pictures and audio information—Part 6: Extensions for DSM-CC", ISO/IEC 13818-6:1998(E).

Webpage: http://groups.google.com/groups?hl=en&lr=&ie=UTF-8&oe=UTF-8&selm=5jqnbm%2411j%40bmerhc5e.bnr.ca, Apr. 25, 1997.

DVB Subtitling FAQ, Softel Ltd., 2001.

Darshan et al., U.S. Patent Appl. No. 09/574,096, "System for Data Stream Processing", May 18, 2000.

Office Action dated Feb. 10, 2008, including English translation, issued in corresponding Israeli Patent Application No.: 158956.

Aug. 19, 2009 extended search report in connection with EP 08 01 0956.

* cited by examiner

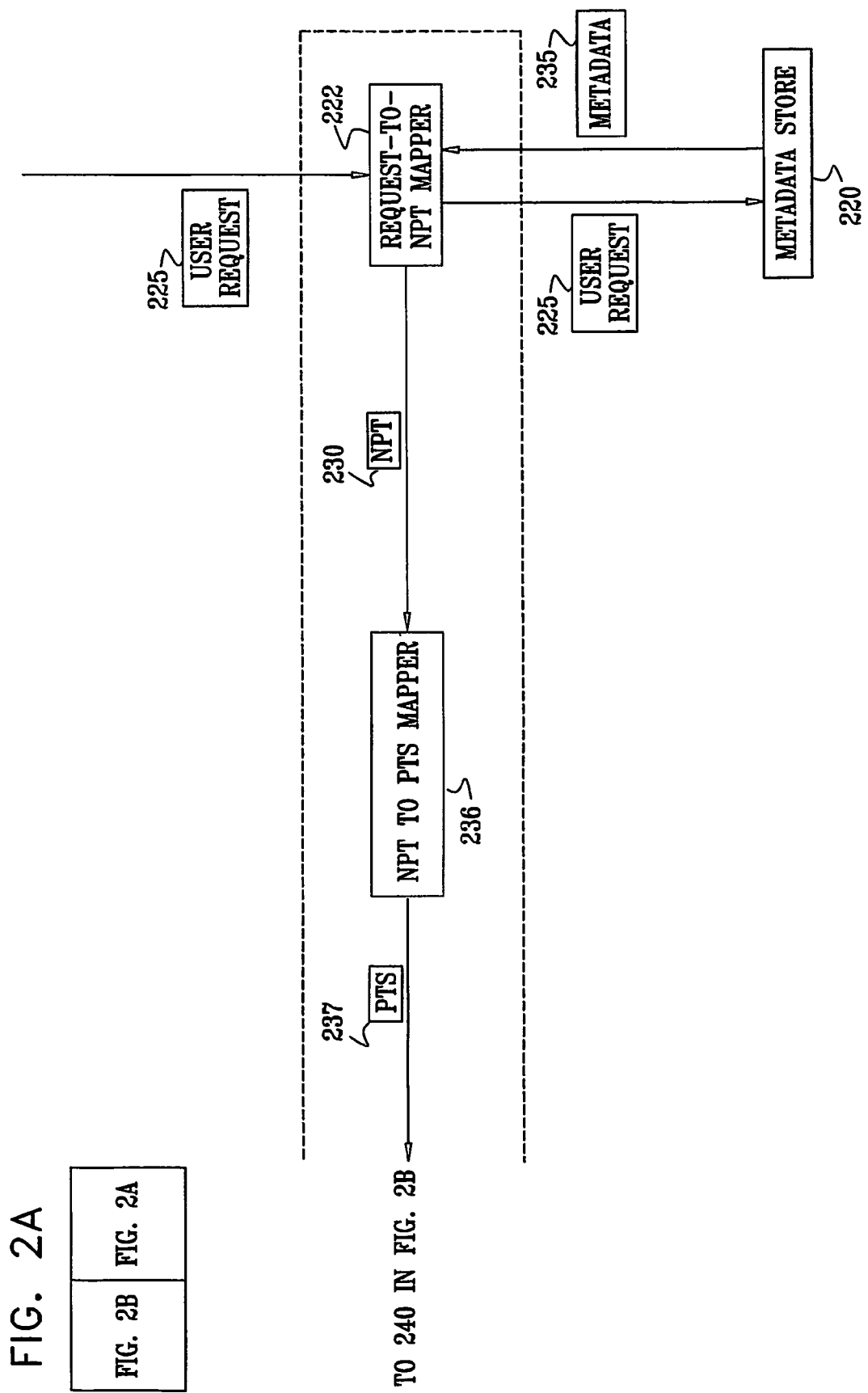

SYSTEM FOR RANDOM ACCESS TO CONTENT

The present application is a 35 USC §371 application of PCT/IL02/00534, filed on 30 Jun. 2002 and entitled "System For Random Access To Content", which was published on 6 Feb. 2003 in the English language with International Publication Number WO 03/010970 A2, and which relies for priority on GB Patent Application No. 0117926.6 filed 23 Jul. 2001 and on U.S. Provisional PATENT Application Ser. No. 60/308,076, filed on 26 Jul. 2001.

FIELD OF THE INVENTION

The present invention relates to apparatus and methods for providing random access to content in a time-synchronized data stream, in particular, though not exclusively, a stored time-synchronized data stream.

BACKGROUND OF THE INVENTION

Systems for data stream encoding, transport, decoding, and related processing are well known in the art. One particular example of such a system is the well-known MPEG-2 system; salient aspects of the MPEG-2 system are described in the following documents:

International Standard ISO/IEC 13818-1: MPEG-2 Part 1 (Systems); and

International Standard ISO/IEC 13818-6: MPEG-2 Part 6 (DSM-CC), sections 8 and 9.

The term "encoded" is used throughout the present specification and claims, in all its grammatical forms, to refer to any type of data stream encoding including, for example and without limiting the scope of the definition, well known types of encoding such as MPEG-2 encoding. It is appreciated that an encoded data stream is generally more difficult to read, in the sense that more processing and typically more time are required to read an encoded data stream than a data stream which is not encoded.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for making a data stream unintelligible except to an intended recipient thereof.

Systems for aiding in providing random access to content in a data stream, particularly in a stored data stream, are known in the art. As will be appreciated by persons skilled in the art, such systems are of particular use with encoded and/or encrypted data streams.

Published PCT Patent Application WO 99/62251 of Koninklijke Philips Electronics NV describes a system in which a data stream is stored and, at the time of storage, an index to the data stream is built.

Published PCT Patent Application WO 01/35669 of NDS Limited and corresponding national applications, including U.S. patent application Ser. No. 09/574,096 of Darshan et al, describes a method for processing a data stream in which an index of candidate access points to the data stream is built and stored, typically as the data stream is received and stored. As stated in WO 01/35669, for the case of the MPEG-2 system, the inventors "determined that the presentation time of a bit and the arrival time of a bit generally differ by no more than a short time such as, for example, approximately 0.5 seconds." It will be appreciated by persons skilled in the art that the characteristic of MPEG-2 systems determined by the inventors of WO 01/35669 would be of use in finding a bit having a desired presentation time provided that the presentation time of a previous bit, such as the first bit in a stream comprising the bits, and relevant bit arrival times are known.

The disclosures of WO 01/35669 and corresponding U.S. patent application Ser. No. 09/574,096 of Darshan et al are hereby incorporated herein by reference.

An advanced television system including storage is described in published PCT patent application WO 00/01149 of NDS Limited and corresponding U.S. patent application Ser. No. 09/515,118 of Wachtfogel et al, the disclosures of which are hereby incorporated herein by reference.

The present application claims priority from UK Patent Application 0117926.6, filed 23 Jul. 2001, and U.S. Provisional Patent Application No. 60/308,076, filed 26 Jul. 2001, the disclosures of which are hereby incorporated herein by reference.

The disclosures of all references mentioned above and throughout the present specification are hereby incorporated herein by reference.

SUMMARY OF THE INVENTION

The present invention seeks to provide improved apparatus and methods for providing random access to content in a time-synchronized data stream, in particular a stored time-synchronized data stream.

In order to provide random access to content in a time-synchronized data stream, it would be desirable to be able to find a point in the stream associated with a given presentation time. The term "presentation time" is used throughout the present specification and claims to refer to a time at which a particular bit or bits in a data stream are supposed to be presented to a user.

MPEG-2 systems, which are well known in the art, are used throughout the present specification by way of example only and without limiting the generality of the present invention.

Presentation time, in the context of MPEG-2, corresponds to Presentation Time Stamp (PTS), which is well known in the art and which is described in International Standard ISO/IEC 13818, referred to above. In the context of MPEG-2, System Time Clock (STC) is a low-level clock used for synchronization. As is well known in the art, PTS represents a presentation time relative to the clock represented by STC. STC and PTS are "non-relative" times in the sense that they do not refer to an offset from the beginning of, for example, a particular video.

In the context of a particular video or other piece of content, for example, the concept of Normal Play Time (NPT), as defined in the DSM-CC standard, ISO/IEC 13818 part 6, referred to above, particularly sections 8 and 9, corresponds to presentation time. NPT is the play time from the beginning of a particular video or other piece of content.

While examples relating to video and/or audio content are used throughout the present specification, persons skilled in the art will appreciate that the present invention applies to any appropriate content, not limited to video and/or audio content. Without limiting the generality of the foregoing, the present invention may be used, for example, with interactive television content.

In preferred embodiments of the present invention, a user request, expressed internal to the system in terms of NPT, is mapped into a corresponding PTS, and a point in a data stream, such as a video stream, corresponding to the PTS is found. Typically, a particular frame or a convenient access point which is near a particular frame is found; preferably, utilization of the data stream begins at the access point. An index such as that produced by the system described in PCT Patent Application WO 01/35669, referred to above, may preferably be used to facilitate access to a convenient access point.

The term "utilization", as used throughout the present specification and claims, includes any appropriate type of utilization such as, for example, any one or any appropriate combination of the following: decoding; displaying; making sensible to at least one human sense; utilizing for splicing; utilizing for storage; and any other appropriate type of utilization.

While the system described in PCT Patent Application WO 01/35669, referred to above, provides useful apparatus and methods that may be helpful in achieving random access to a time-synchronized data stream, the WO 01/35669 system generally provides the ability to determine relative presentation time of one bit in terms of another bit, rather than a non-relative presentation time. The present invention, in preferred embodiments thereof, seeks to improve on the prior art, and in particular on the system of WO 01/35669, by providing access based on a non-relative presentation time. To do this, the present invention, in preferred embodiments thereof, preferably makes use, inter alia, of additional system timing information whose availability is not described or made use of in the system of WO 01/35669.

There is thus provided in accordance with a preferred embodiment of the present invention a method for accessing a desired point in time-synchronized data within a stream, the stream being associated with time information, the method including providing a desired presentation time associated with a desired point within a time-synchronized data stream, determining a stream access point, decoding the stream beginning at the stream access point, and assigning a time associated with the stream access point as a utilization time.

Further in accordance with a preferred embodiment of the present invention the time-synchronized data stream includes a stored time-synchronized data stream.

Still further in accordance with a preferred embodiment of the present invention the method also includes, after the decoding, continuing to decode the stream until a time at which presentation time information associated with the stream corresponds to a presentation time greater than or equal to the desired presentation time, wherein the time associated with the stream access point includes the time at which presentation time information associated with the stream corresponds to a presentation time greater than or equal to the desired presentation time.

Additionally in accordance with a preferred embodiment of the present invention the desired point includes a desired frame.

Moreover in accordance with a preferred embodiment of the present invention the method also includes utilizing the stream beginning at the utilization time.

Further in accordance with a preferred embodiment of the present invention the utilizing includes making the stream sensible to at least one human sense.

Still further in accordance with a preferred embodiment of the present invention the utilizing includes displaying the stream.

Additionally in accordance with a preferred embodiment of the present invention the utilizing includes utilizing the stream other than by making the stream sensible to at least one human sense.

Moreover in accordance with a preferred embodiment of the present invention the utilizing includes performing a splicing process.

Further in accordance with a preferred embodiment of the present invention the utilizing includes performing a storing process.

Still further in accordance with a preferred embodiment of the present invention the determining a stream access point includes determining a lower bound after which the desired point is likely to be found, and assigning the stream access point to be a first point at or after the lower bound at which decoding of the stream is available.

Additionally in accordance with a preferred embodiment of the present invention the determining a stream access point includes determining a lower bound after which the desired point is likely to be found, and assigning the stream access point to be a point nearest the lower bound at which decoding of the stream is available.

Moreover in accordance with a preferred embodiment of the present invention the point at which decoding of the stream is available includes a point at which efficient decoding of the stream is available Further in accordance with a preferred embodiment of the present invention the point at which efficient decoding of the stream is available includes a key frame.

Still further in accordance with a preferred embodiment of the present invention the stream includes an MPEG-2 stream and the key frame includes an I-frame.

Additionally in accordance with a preferred embodiment of the present invention the lower bound is determined, at least in part, according to a presentation time of a desired frame.

Moreover in accordance with a preferred embodiment of the present invention the stream includes an MPEG-2 stream and the lower bound is within 1 second plus GOP duration of the MPEG-2 PTS value of the desired frame.

Further in accordance with a preferred embodiment of the present invention the lower bound is between approximately 0.7 and approximately 1.2 seconds before the desired presentation time.

Additionally in accordance with a preferred embodiment of the present invention the desired presentation time includes a normal play time indication.

Moreover in accordance with a preferred embodiment of the present invention the determining a stream access point includes mapping the normal play time indication to a corresponding presentation time stamp.

Further in accordance with a preferred embodiment of the present invention the utilization time includes a presentation time stamp.

Still further in accordance with a preferred embodiment of the present invention the stream includes an MPEG-2 stream and the presentation time stamp includes MPEG-2 PTS.

Additionally in accordance with a preferred embodiment of the present invention the determining a stream access point includes utilizing an access point index.

Moreover in accordance with a preferred embodiment of the present invention the access point index includes a heuristic index.

Further in accordance with a preferred embodiment of the present invention the access point index includes a RASP index.

Still further in accordance with a preferred embodiment of the present invention the stream includes an MPEG-2 stream.

Additionally in accordance with a preferred embodiment of the present invention the stream includes an encrypted stream, and the method also includes decrypting the encrypted stream.

Moreover in accordance with a preferred embodiment of the present invention the time-synchronized data includes audio and/or video data.

Further in accordance with a preferred embodiment of the present invention the time-synchronized data includes interactive television data.

There is also provided in accordance with another preferred embodiment of the present invention a method for accessing a desired access point in time-synchronized data within a stream, the stream being associated with time information, the method including providing a desired presentation time associated with a desired point within a time-synchronized data stream, determining a stream access point, examining time information associated with the stream, beginning at the stream access point, and continuing to examine the time information associated with the stream, at at least one additional stream access point, until a desired access point, including a last access point at which associated time information corresponds to a time less than or equal to the desired time, is found.

Further in accordance with a preferred embodiment of the present invention the time-synchronized data stream includes a stored time-synchronized data stream.

Still further in accordance with a preferred embodiment of the present invention the desired point includes a desired fame.

Additionally in accordance with a preferred embodiment of the present invention the method also includes utilizing the stream beginning at the utilization time.

Moreover in accordance with a preferred embodiment of the present invention the utilizing includes making the stream sensible to at least one human sense.

Further in accordance with a preferred embodiment of the present invention the utilizing includes displaying the stream.

Still further in accordance with a preferred embodiment of the present invention the utilizing includes utilizing the stream other than by making the stream sensible to at least one human sense.

Additionally in accordance with a preferred embodiment of the present invention the utilizing includes performing a splicing process.

Moreover in accordance with a preferred embodiment of the present invention the utilizing includes performing a storing process.

Further in accordance with a preferred embodiment of the present invention the determining a stream access point includes determining a lower bound after which the desired point is likely to be found, and assigning the stream access point to be a first point at or after the lower bound at which decoding of the stream is available.

Still further in accordance with a preferred embodiment of the present invention the determining a stream access point includes determining a lower bound after which the desired point is likely to be found, and assigning the stream access point to be a point nearest the lower bound at which decoding of the stream is available.

Additionally in accordance with a preferred embodiment of the present invention the point at which decoding of the stream is available includes a point at which efficient decoding of the stream is available.

Moreover in accordance with a preferred embodiment of the present invention the point at which efficient decoding of the stream is available includes a key frame.

Further in accordance with a preferred embodiment of the present invention the stream includes an MPEG-2 stream and the key frame includes an I-frame.

Still further in accordance with a preferred embodiment of the present invention the lower bound is determined, at least in part, according to a presentation time of a desired frame.

Additionally in accordance with a preferred embodiment of the present invention the stream includes an MPEG-2 stream and the lower bound is within 1 second plus GOP duration of the MPEG-2 PTS value of the desired frame.

Moreover in accordance with a preferred embodiment of the present invention the lower bound is between approximately 0.7 and approximately 1.2 seconds before the desired presentation time.

Further in accordance with a preferred embodiment of the present invention the desired presentation time includes a normal play time indication.

Still further in accordance with a preferred embodiment of the present invention the determining a stream access point includes mapping the normal play time indication to a corresponding presentation time stamp.

Additionally in accordance with a preferred embodiment of the present invention the utilization time includes a presentation time stamp.

Moreover in accordance with a preferred embodiment of the present invention the stream includes an MPEG-2 stream and the presentation time stamp includes MPEG-2 PTS.

Further in accordance with a preferred embodiment of the present invention the determining a stream access point includes utilizing an access point index.

Still further in accordance with a preferred embodiment of the present invention the access point index includes a heuristic index.

Additionally in accordance with a preferred embodiment of the present invention the access point index includes a RASP index.

Moreover in accordance with a preferred embodiment of the present invention the stream includes an MPEG-2 stream.

Further in accordance with a preferred embodiment of the present invention the stream includes an encrypted stream, and the method also includes decrypting the encrypted stream.

Still further in accordance with a preferred embodiment of the present invention the time-synchronized data includes audio and/or video data.

Additionally in accordance with a preferred embodiment of the present invention the time-synchronized data includes interactive television data.

There is also provided in accordance with another preferred embodiment of the present invention a method for producing a play time index of encoded data, the method including providing encoded data encoding material suitable for play out, sampling the encoded data, and producing a play time index of the material suitable for play out based on a result of the sampling.

Further in accordance with a preferred embodiment of the present invention the play time index includes a mapping from a play time to a system time value.

Still further in accordance with a preferred embodiment of the present invention the encoded data includes MPEG-2 encoded data, and the play time includes MPEG-2 NPT, and the system time value includes MPEG-2 STC.

There is also provided in accordance with another preferred embodiment of the present invention a data stream accessor for accessing a desired point in time-synchronized data within a stream, the stream being associated with time information, the data stream accessor including a stream access point determiner receiving a desired presentation time associated with a desired point within a time-synchronized data stream and determining a stream access point, a stream decoder decoding the stream beginning at the stream access point, and a time assignor assigning a time associated with the stream access point as a utilization time.

There is also provided in accordance with still another preferred embodiment of the present invention a data stream accessor for accessing a desired access point in time-synchronized data within a stream, the stream being associated with time information, the data stream accessor including a stream access point determiner receiving a desired presentation time associated with a desired point within a time-synchronized data stream and determining a stream access point, and a time examiner operative to examine time information associated with the stream, beginning at the stream access point, and to continue to examine the time information associated with the stream, at at least one additional stream access point, until a desired access point, including a last access point at which associated time information corresponds to a time less than or equal to the desired time, is found.

There is also provided in accordance with yet another preferred embodiment of the present invention a play time indexer for producing a play time index of encoded data, the play time indexer including a sampler receiving encoded data encoding material suitable for play out and sampling the encoded data, and an index builder producing a play time index of the material suitable for play out based on a result produced by the sampler.

BRIEF DESCRIPTION OF THE DRAWINGS

The present invention will be understood and appreciated more fully from the following detailed description, taken in conjunction with the drawings in which:

FIGS. 2A and 2B, taken together, comprise a simplified block diagram illustration of a preferred implementation of a portion of the system of FIG. 1;

DETAILED DESCRIPTION OF A PREFERRED EMBODIMENT

Figure 1:
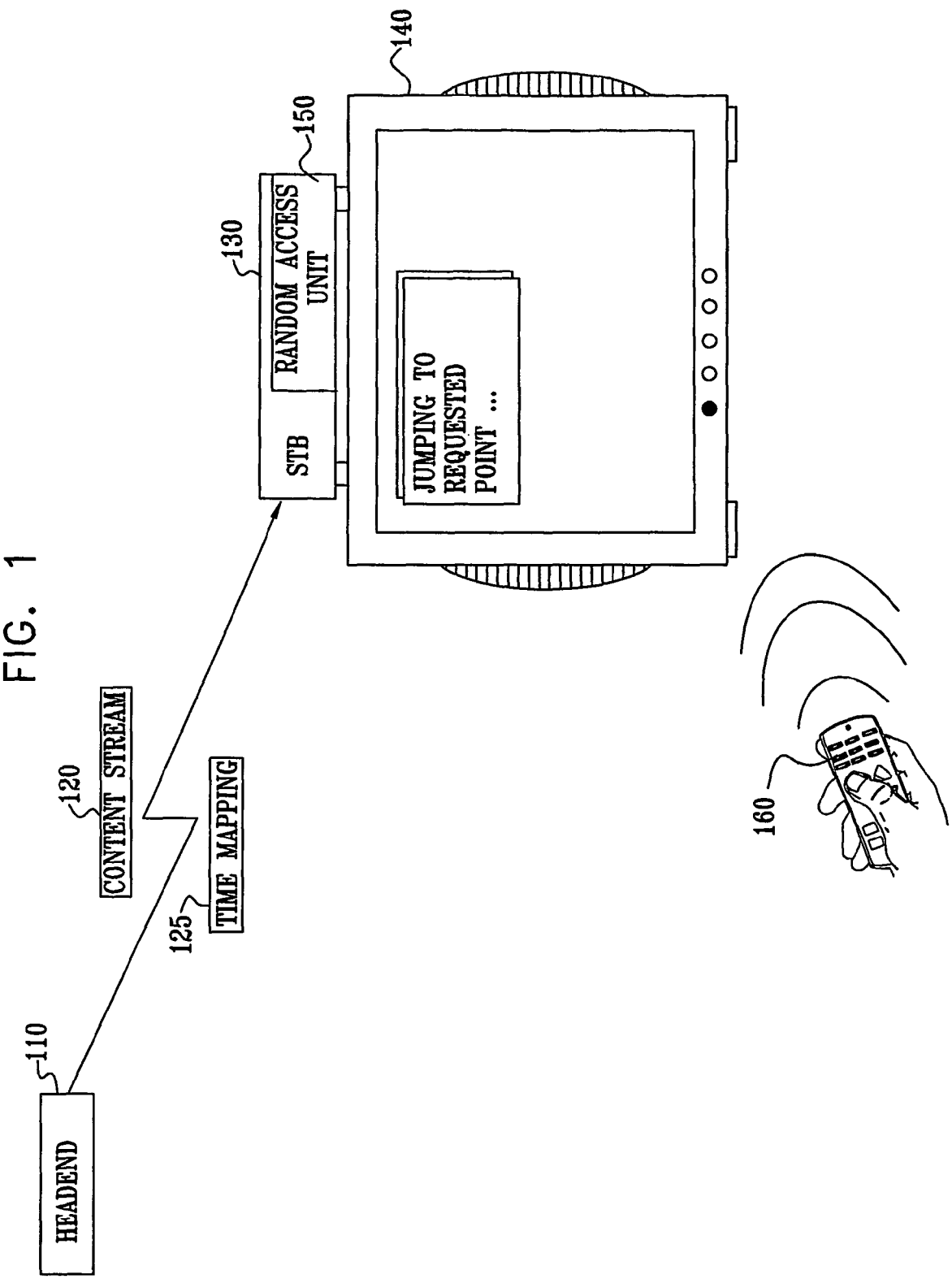
FIG. 1 is a simplified partially pictorial, partially block diagram illustration of a system for providing random access to content in a time-synchronized data stream, the system being constructed and operative in accordance with a preferred embodiment of the present invention.

Reference is now made to FIG. 1, which is a simplified partly pictorial, partly block diagram illustration of a system for providing random access to content in a time-synchronized data stream, the system being constructed and operative in accordance with a preferred embodiment of the present invention.

The system of FIG. 1 preferably comprises a source of content such as, for example, a headend 110. The headend 110 preferably distributes a time-synchronized data stream, such as a content stream 120. The example of the content stream 120 is not meant to be limiting; any appropriate time-synchronized data stream may alternatively be used. Generally, the term "time-synchronized data stream" is used, in all of its grammatical forms, throughout the present specification and claims, to refer to a data stream in which the data in the stream is synchronized or otherwise associated with particular points in time. As is well known in the art and as is described in more detail below, the content stream 120 may include both content and metadata (not shown), the metadata comprising data which describes the content;

The headend 110 may distribute the content stream 120 via any appropriate method of distribution. Appropriate methods of distribution may include, for example, any one or combination of the following: broadcast, including satellite broadcast, digital terrestrial broadcast, or any other appropriate type of broadcast; distribution via cable; distribution via a telephone system, such as a public switched telephone network (PSTN) or a private telephone network; distribution via a computer network, such as a local area network, a wide area network, or an inter-network such as the Internet; or any other appropriate method of distribution, as is well known in the art.

The content stream 120 is received by one or more receiving devices, typically but not necessarily comprising a multiplicity of receiving devices. Each receiving device may comprise, for example: a suitably programmed computer, such as a suitably programmed personal computer equipped with suitable hardware for receiving the content stream 120 as distributed using whatever method of distribution is used by the headend 110; a suitably equipped set top box typically associated with a television used as a display device; or any other appropriate receiving device. For sake of simplicity of description and without limiting the generality of the foregoing, a single set top box 130 and associated television 140 are shown in FIG. 1 by way of example.

The headend 110 also preferably distributes additional information, shown in FIG. 1 as a time mapping 125, which may be useful, as described in more detail below, in providing random access to specific content within the content stream 120.

The set top box 130 preferably comprises, in addition to standard set top box components as are well known in the art, a random access unit 150. The random access unit 150 is preferably operative, as described in more detail below, particularly with reference to FIGS. 2A and 2B, to control random access to the content stream 120.

Persons skilled in the art will appreciate that the random access unit 150 may, alternatively, be situated external to the set top box 130 and appropriately operatively associated therewith, although it is believed to be preferable for the random access unit 150 to be comprised in the set top box 130 as shown.

Preferably, the system of FIG. 1 also comprises appropriate means or apparatus for allowing a user to control operation of the set top box 130 and the television 140 such as, for example, a remote control unit 160, as is well known in the art.

It is appreciated that various subcombinations of the system of FIG. 1 may also comprise a preferred embodiment of the present invention. In particular, each of the following are non-limiting examples of such subcombinations:

1. The set top box 130, the television 140, and the remote control unit 160;
2. The set top box 130 and the television 140;
3. The set top box 130; and
4. The random access unit 150.

The operation of the system of FIG. 1 is now briefly described.

The headend 110 transmits the content stream 120; the content stream 120 is received by the set top box 130 and is typically stored therein in a suitable memory or other store (not shown in FIG. 1), as is well known in the art. One particular non-limiting example of a suitable television system including storage is described in published PCT patent application WO 00/01149 of NDS Limited and corresponding U.S. patent application Ser. No. 09/515,118 of Wachtfogel et al, the disclosures of which are hereby incorporated herein by reference.

It is appreciated that the content stream 120 may include, as is well known in the art, at least: content intended for display or other rendering to make the content sensible to one or more human senses; and data describing the content, said data being known in the art as "metadata". The metadata may include, in particular and as described in more detail in published PCT patent application WO 00/01149 of NDS Limited and corresponding U.S. patent application Ser. No. 09/515, 118 of Wachtfogel et al, referred to above, so called "tags" which indicate certain portions of content that are deemed to be "interesting". For example and without limiting the generality of the foregoing, a content stream might include a news program. Hierarchically-arranged tags might be provided to indicate the starting presentation time, from the beginning of the news program, of:

1) (tag 1) National news, and within national news:
   a) (tag 2) a first national news story;
   b) (tag 3) a-second national news story, and within the second national news story:
      i) (tag 4) a first video clip; and
      ii) (tag 5) a second video clip; and
   c) (tag 6) a third national news story.
2) (tag 7) Local news, and within local news:
   a) (tag 8) a first local news story; and
   b) (tag 9) a second local news story.
3) (tag 10) Weather.

A suitable user interface is preferably provided by the set top box 130 and the television 140 so that a user may use the remote control 160 to request a particular desired point within the news program which the user wishes to view. To continue the above example, if the user requests, for example, the first local news story, then the random access unit 150 preferably uses metadata included in or associated with tag 8, along with time mapping 125 and other information, to determine the desired presentation time, within the news program, of the first local news story.

In order to present the desired point to the user, the random access unit 150 then determines, from the desired presentation time, a point within the content stream 120 from which display should begin.

Figure 2B:
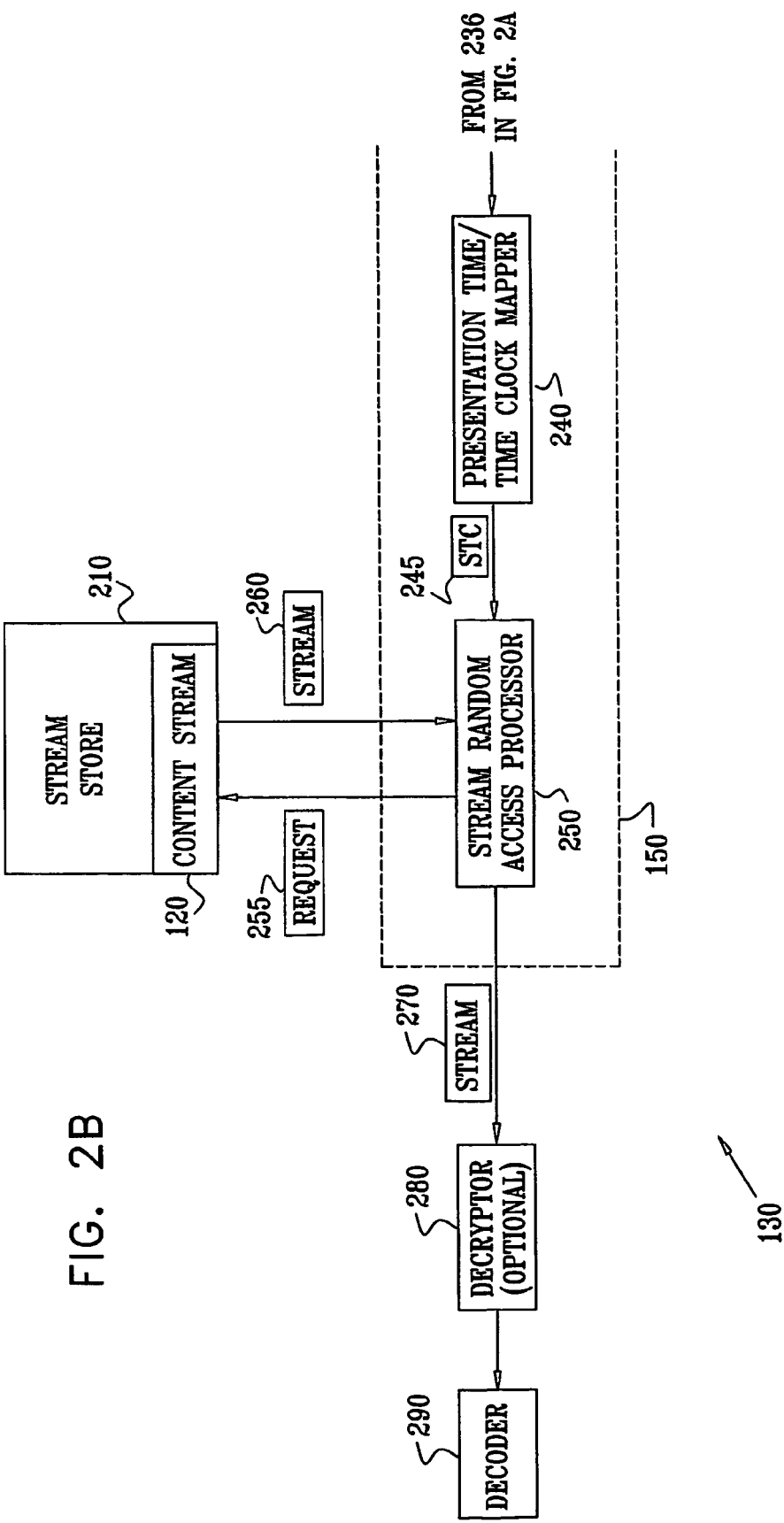

Reference is now made to FIGS. 2A and 2B, which, taken together, comprise a simplified block diagram illustration of a preferred implementation of a portion of the system of FIG. 1, comprising the set top box 130, including the random access unit 150. For the sake of simplicity of description, conventional set top box components well known in the art, including components used for signal tuning have been omitted from FIGS. 2A and 2B; persons skilled in the art will appreciate how to include said conventional components.

In the description of FIGS. 2A and 2B in particular, and in general in the present specification, the specific example of an MPEG-2 system is used; the example is not meant to be limiting. In general, the present invention is applicable to other appropriate media compression schemes. Furthermore, as explained above, the specific example of video is used; the example is not meant to be limiting. In general, the present invention is applicable to any appropriate content, not limited to video and/or audio content; without limiting the generality of the foregoing, the present invention may be used, for example, with interactive television content.

The set top box 130 preferably comprises, in addition to the random access unit 150, a stream store 210 and a metadata store 220, each of which comprises any suitable read/write capable mass storage device (not shown) such as, for example a high capacity disk drive or similar device, in association with an appropriately programmed processor. Each processor (not shown) comprised in the stream store 210 and the metadata store 220 is preferably operative, as described in more detail below, to receive appropriately formatted requests and to respond to those requests, said response typically comprising information stored in the respective mass storage device (not shown) or an indication that the request can not be fulfilled.

Preferably, the capacity of the stream store 210 should be at least approximately 20 gigabytes, while the capacity of the metadata store 220 should be at least approximately 50 megabytes.

It is appreciated that the stream store 210 and the metadata store 220 may be implemented separately or in a single unit.

The stream store 210 is preferably operative, upon request, to store and retrieve at least one time-synchronized data stream such as the content portion of content stream 120 of FIG. 1; typically, the stream store 210 is operative to store a plurality of time-synchronized data streams. The metadata store 220 is preferably operative, upon request, to store and retrieve metadata, such as the metadata described above with reference to FIG. 1, associated with the time-synchronized data stream stored in the stream store 210.

It is appreciated that the metadata and the stream are both typically comprised in the content stream 120 of FIG. 1 and both typically arrive at the set top box 130 concurrently; preferably, as part of the process of storing in the stream store 210 and in the metadata store 220, the set top box 130 stores information defining the association between the time-synchronized data stream and the metadata associated therewith.

The random access unit 150 is preferably implemented in any suitable combination of hardware and software, as is well known in the art. One particular non-limiting example of a preferred embodiment of the random access unit 150 is found in published PCT Patent Application WO 01/35669 of NDS Limited and corresponding national applications, including U.S. patent application Ser. No. 09/574,096 of Darshan et al, referred to above and incorporated herein by reference.

The random access unit 150 preferably comprises a request-to-normal-play-time (request-to-NPT) mapper 222. The request-to-NPT mapper 222 is preferably operative to receive a user request 225, such as a request to view a particular portion of a program in the content stream 120 stored in the stream store 210. The request-to-NPT mapper is preferably operative to produce as output a play time indication such as, in the example of MPEG-2, an NPT indication 230 of a play time within the stored stream which is associated with a point in the content stream 120 to which random access should occur in order to fulfill the user request 225.

Preferably, the request-to-NPT mapper 222 is operative to produce the NPT indication 230 by sending the user request 225 to the metadata store 220 and receiving therefrom metadata 235 associated with a desired point in the content stream 120 to which random access should take place in order to fulfill the user request 225. The metadata 235 preferably includes an indication of an NPT associated with the desired point. Thus, the request-to-NPT mapper 222 produces the NPT indication 230 from the user request 225.

The random access unit 150 also preferably comprises an NPT-to-PTS mapper 236. As described above and in ISO/IEC 13818-6, referred to above, and as will be appreciated by persons skilled in the art, NPT comprises a presentation time indication expressed in terms of play time from the beginning of a particular video. The NPT-to-PTS mapper 236 receives as input the NPT 230 produced by the request-to-NPT mapper 222 and produces as output a corresponding PTS 237; preferably, the NPT-to-PTS mapper 236 makes use of the time mapping 125 of FIG. 1 to produce the PTS 237 from the NPT 230. A preferred method of producing the time mapping 125 in the headend 110 of FIG. 1 is described in more detail below with reference to FIG. 6.

As described above and as will be appreciated by persons skilled in the art, PTS comprises an indication of presentation time expressed in terms of System Time Clock (STC), a low-level clock used for synchronization; PTS is thus a non-relative time, not relating to play time from the beginning of a particular video.

The random access unit 150 also preferably comprises a) presentation time/time clock mapper 240. The presentation time/time clock mapper 240 preferably receives the PTS 237 from the NPT-to-PTS mapper 236. Persons skilled in the art will appreciate that for media compressions schemes such as, for example, MPEG-2, which make use of significant decoding buffers, there is not a direct relationship between the PTS of an event and the position of the compressed data for the event in the stored stream. The presentation time/time clock mapper 240 is preferably operative to determine a time window in non-relative time, the time window being shown in FIG. 2B as an STC indication 245, indicating the STC of the beginning of a window in the stored stream within which the desired point requested by the user in user request 225 is likely to be found. The beginning of the time window is also termed herein a "lower bound".

A preferred mode of operation of the presentation time/time clock mapper 240 is now briefly described.

In order to determine an appropriate window of time in which a desired frame can be found, the inventors of the present invention have analyzed the theoretical and actual behavior of MPEG-2 systems as an example of a typical system with which the present invention can be used.

Consider the start of the compressed data for a frame, f, entering a decoder. Let the STC at that moment be STC-fe. Frame f leaves the decoder buffer at its decoding time stamp (DTS), denoted DTS-f.

According to MPEG-2 Systems Layer, as described in ISO IEC 13818-1 2.4.2.6:

$$0 < DTS\text{-}f - STC\text{-}fe <= 1 \text{ sec} \quad (1)$$

After being removed from the decoder buffer, the frame is assumed to be decoded in zero time. It is presented at its PTS, PTS-f. We can say the following about PTS-f and DTS-f:

$$PTS\text{-}f - DTS\text{-}f <= GOP \text{ duration if f is an I-frame or P-frame} \quad (2a)$$

$$PTS\text{-}f - DTS\text{-}f = 0 \text{ if f is a B-frame} \quad (2b)$$

Preferably, in order to decode frame f, we first find an access point associated with frame f, the access point being the location of the I-frame upon which frame f depends.

Let the STC at the moment the I-frame enters the decoder be STC-ie. Then the following holds true for STC-fe and STC-ie:

$$STC\text{-}fe - STC\text{-}ie = 0 \text{ if f is an I-frame} \quad (3a)$$

$$STC\text{-}fe - STC\text{-}ie \sim= GOP \text{ duration if f is the last} \\ \text{B-frame in the GOP (a little more if f is an early} \\ \text{B-frame in an open GOP)} \quad (3b)$$

If f is a P-frame, then it is believed by the inventors of the present invention that the value of PTS-f−DTS-f lies somewhere in between the two bounds 3a and 3b.

Consider how to express STC-ie in terms of PTS-f. The ranges of uncertainty cancel out in the cases of I-frames and B-frames; it is assumed that this is true for P-frames also. Combining the above yields:

$$PTS\text{-}f > STC\text{-}ie > (PTS\text{-}f - 1 \text{ second} - \sim GOP \text{ duration}) \quad (4)$$

As defined in ISO/IEC 13818-1, STC is sampled by PCR.

The term "RASP index", in all of its grammatical forms, is used throughout the present specification and claims to refer to an index of the type which may be built using the system described in PCT Patent Application WO 01/35669 and corresponding national applications, referred to and incorporated by reference above.

The RASP index comprises an index of PCR vs. access point position. Therefore, inequality (4) also defines a window of PCR values and hence stream positions which contains the desired access point. The PCR/STC value in the stream at the location of the desired access point is generally within 1 second plus GOP duration of the PTS value of the desired frame.

Thus, the bounds in which one would expect to find the access point required to decode frame f are computable, given the PTS of the frame f. Since this range could contain more than one Access Point, what remains is to determine which of the candidates is the correct one.

The range of possible STC-ie for a given PTS-f as shown in equation (4) above, 1 second plus GOP duration, is rather large; therefore, for practical purposes, it would be preferable to constrain the range. In particular, any individual stream is likely to have a smaller range of STC-ie values, since it is unlikely that decoder buffer occupancy varies over the full range given in equation (1) above.

The inventors of the present invention believe that the range can not be further constrained on purely theoretical grounds; therefore, the inventors of the present invention have adopted a practical approach of investigating real streams. The inventors have found that the distribution of STC-ie values relative to PTS-f is modal. By ignoring the outliers at either end of the distribution, one can limit the window of (PTS-f−STC-ie) values while capturing 95% percent of cases.

Analysis of results from a variety of different streams yields the following observations:

In all the streams analyzed, for 95% of frames the window of offsets of Access Point position from PTS-f is approximately 0.5-0.7 seconds wide.

The offset of this window from PTS-f is not the same in each stream, and varies in the range 0.2-0.5 seconds. The inventors of the present invention believe that this offset is dependent on encoder configuration, and could be determined and signaled by the headend 110 of FIG. 1, as part of the process of generating the time mapping 125 of FIG. 1. The headend 110 of FIG. 1 preferably determines the constant offset of PTS-f, in an encoder (not shown) comprised in the headend 110 of FIG. 1, from the instantaneous value of STC in the stream in order to build the mapping of NPT to STC.

The random access unit 150 further preferably comprises a stream random access processor 250. The stream random access processor 250 is preferably operative to receive the STC indication 245 from the presentation time/time clock mapper 240 and to locate a point in the stored content stream 120 which is near to the time of the STC indication 245; a preferred method for performing this operation is described in more detail below.

Briefly, in a first preferred implementation, the stream random access processor 250 sends a request 255 comprising the STC indication 245 to the stream store 210, receiving back from the stream store 210 a stream 260, typically comprising an encoded stream. The stream random access processor 250 then preferably outputs the stream 260 to a decoder 270, instructing the decoder 270 to begin utilization of the stream 260 at a point at which a PTS in the stream 260 is found which is greater than or equal to the PTS indication 237, which indicates the point in PTS corresponding to the user request 225.

Persons skilled in the art will readily appreciate how to modify a standard decoder to function as the decoder 270, it being appreciated that standard decoders are operative to display a frame at a given STC; therefore, the additional functionality required by the present invention would be a small change within the ability of persons skilled in the art.

In a second preferred implementation, the stream 260 is examined until a point at which a PTS in the stream 260 is found which is greater than or equal to the STC indication 245. The stream random access processor 250 then preferably outputs the stream starting at the requested point for appropriate utilization.

Figure 3:
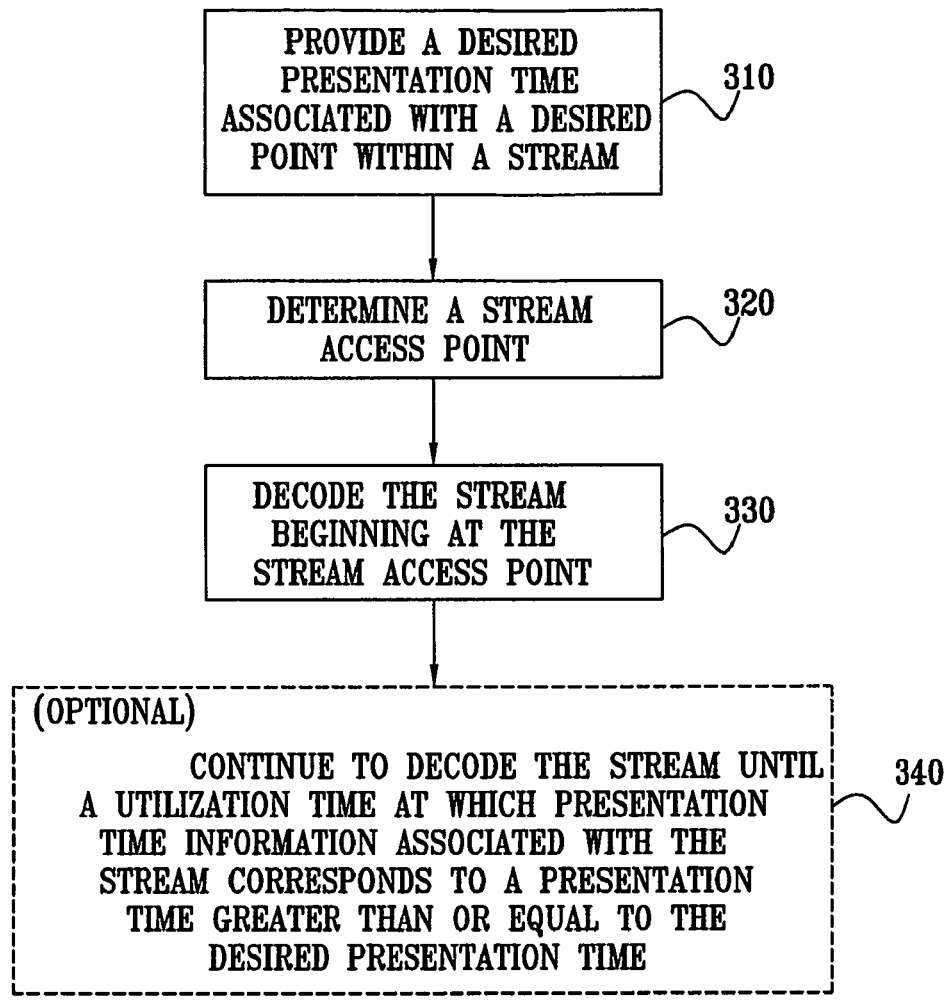
FIG. 3 is a simplified flowchart illustration of a preferred method of operation of the apparatus of FIG. 2.

In both preferred implementations, the stream store 210 is preferably operative to use an access point index to provide the stream 260 beginning at a convenient access point having an STC value near and preferably before the STC indication 245. The access point index may comprise a heuristic index, preferably a so-called "RASP index", as defined above. Reference is now made to FIG. 3, which is a simplified flowchart illustration of a preferred method of operation of the apparatus of FIG. 2. The method of FIG. 3 preferably comprises the following steps:

A desired presentation time is provided; the desired presentation time is associated with a desired point within a stream (step 310). As described above with reference to FIG. 2, the desired presentation time is preferably based on a user request and is preferably derived from the user request based on metadata information describing the stream. It is appreciated, however, that the present invention is not-limited to the particular case described with reference to FIG. 2; in particular, the method of FIG. 3 is generally applicable whether or not the desired presentation time is based on a user request.

A stream access point is determined (step 320). Preferably, a stream access point comprises a point at which efficient decoding of the stream is available; in the particular case of an MPEG-2 system, a stream access point preferably comprises a point at which an I-frame is found. A preferred method of implementation of step 320 is described in more detail below with reference to FIG. 4.

The stream is decoded beginning at the stream access point (step 330); decoding preferably but optionally continues until a point in the stream where presentation time information associated with the stream corresponds to a presentation time greater than or equal to the desired presentation time; the presentation time information at that point in the stream is termed herein a "utilization time" (step 340).

Once the utilization time has been found, the stream may be utilized as desired; without limiting the generality of the foregoing, the stream may be utilized by decoding the stream and making the stream sensible to at least one human sense; further without limiting the generality of the foregoing, the stream is typically displayed.

It is appreciated that, in a case where the stream is encrypted, the method of FIG. 3, preferably in step 330, may also include decrypting the stream. Alternatively, in a case, for example, of splicing an encrypted stream to produce a spliced encrypted stream, the method of FIG. 3 may not, and preferably does not, include decrypting the stream.

Figure 4:
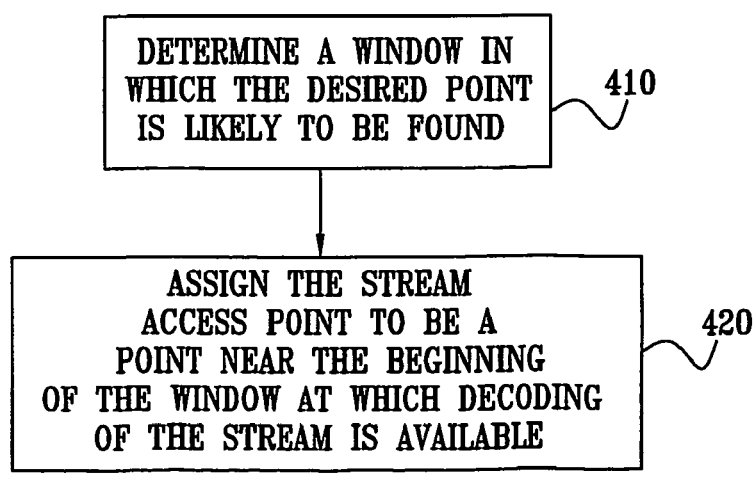
FIG. 4 is a simplified flowchart illustration of a preferred implementation of a portion of the method of FIG. 3.

Reference is now made to FIG. 4, which is a simplified flowchart illustration of a preferred implementation of step 320 of the method of FIG. 3. The method of FIG. 4 preferably includes the following steps:

A window in which the desired point is likely to be found is determined (step 410). As described above with reference to FIG. 2, the size of the window may vary but is typically between approximately 0.5 and 0.7 seconds; the window's offset is as described above.

The screen access point is assigned as a point, near the beginning of the window determined in step 410, at which decoding of the stream is available (step 420). In this context, "near" refers to one or more of the following: a point at or after the beginning of the window determined in step 410; or a point nearest the beginning of the window, whether before or after the beginning of the window.

Without limiting the generality of the foregoing, in preferred embodiments of the present invention an index, such as a heuristic index and particularly a RASP index, may be used to assist in finding and assigning an appropriate stream access point in the method of FIG. 4.

It will be appreciated by persons skilled in the art that decoding of the stream may not be available at every point; that is, depending on the way in which the stream is encoded, decoding of the stream may be available only at certain bit locations within the stream. In the case of an MPEG-2 stream, for example, decoding of the stream is typically available only at the beginning of a frame.

Furthermore, in some streams, some points at which decoding of the stream is available afford more efficient decoding than other such points. In a case where points exist at which efficient decoding of the stream is available, the screen access point is preferably assigned to be such a point. To continue the example of an MPEG-2 stream, a point at which efficient decoding of the stream is available preferably comprises the beginning of an I-frame or a video sequence.

Figure 5:
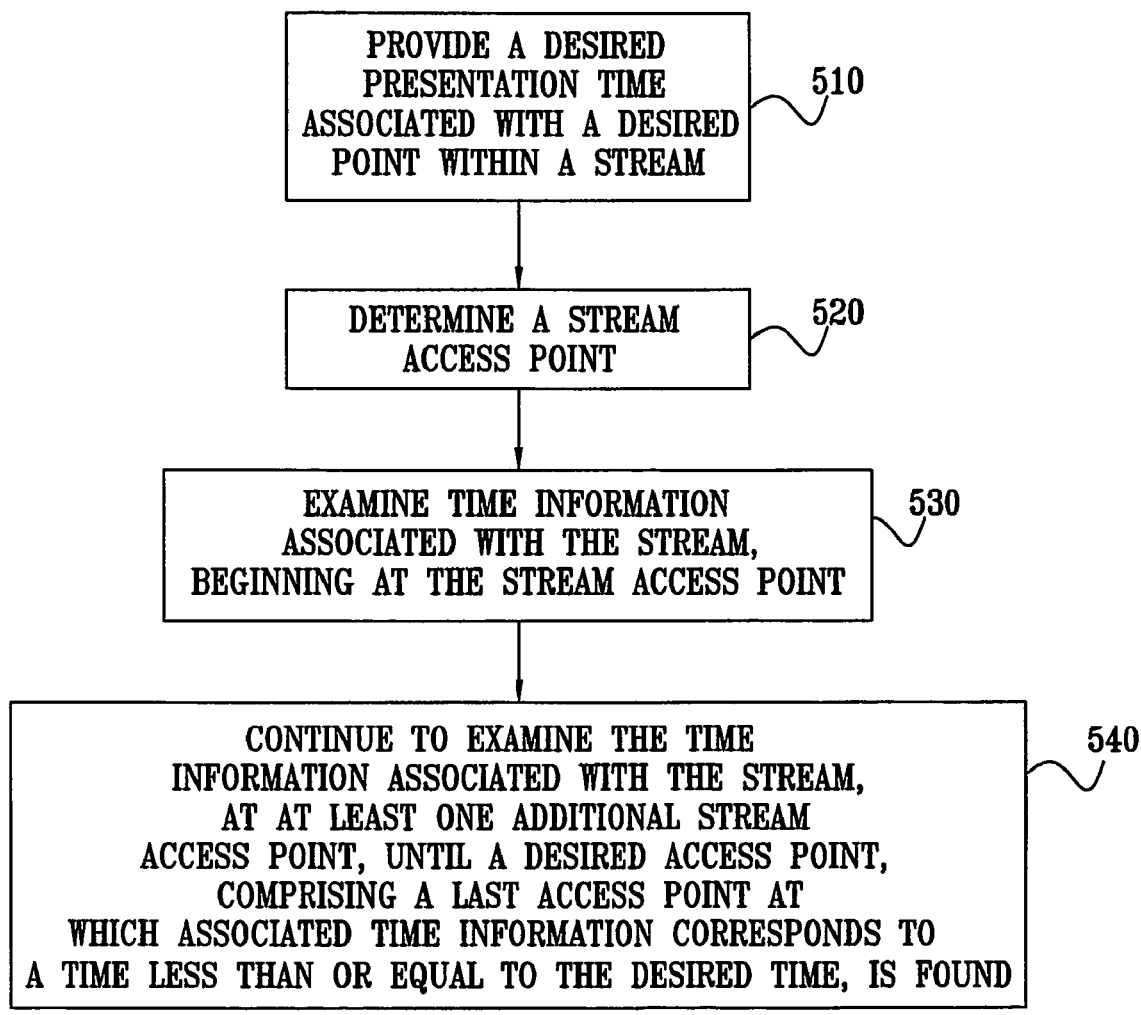
FIG. 5 is a simplified flowchart illustration of an alternative preferred method of operation of the apparatus of FIG. 2.

Reference is now made to FIG. 5, which is a simplified flowchart illustration of an alternative preferred method of operation of the apparatus of FIG. 2. The method of FIG. 5 preferably comprises the following steps:

A desired presentation time is provided; the desired presentation time is associated with a desired point within a stream (step 510). A stream access point is determined (step 520). Steps 510 and 520 are preferably similar to steps 310 and 320 of FIG. 3, described above, including the preferred implementation of step 320 described above with reference to FIG. 4.

Beginning at the stream access point, time information associated with the stream is examined (step 530). Examination of time information associated with the stream continues at at least one additional stream access point, until a desired access point is found; the desired access point preferably comprises a last access point at which associated time information is less than or equal to the desired access time (step 540). It is appreciated that, in order to carry out step 540, it may be necessary to examine an access point whose time information is greater than the desired access time, and then to "move backwards" to the desired access point.

Figure 6:
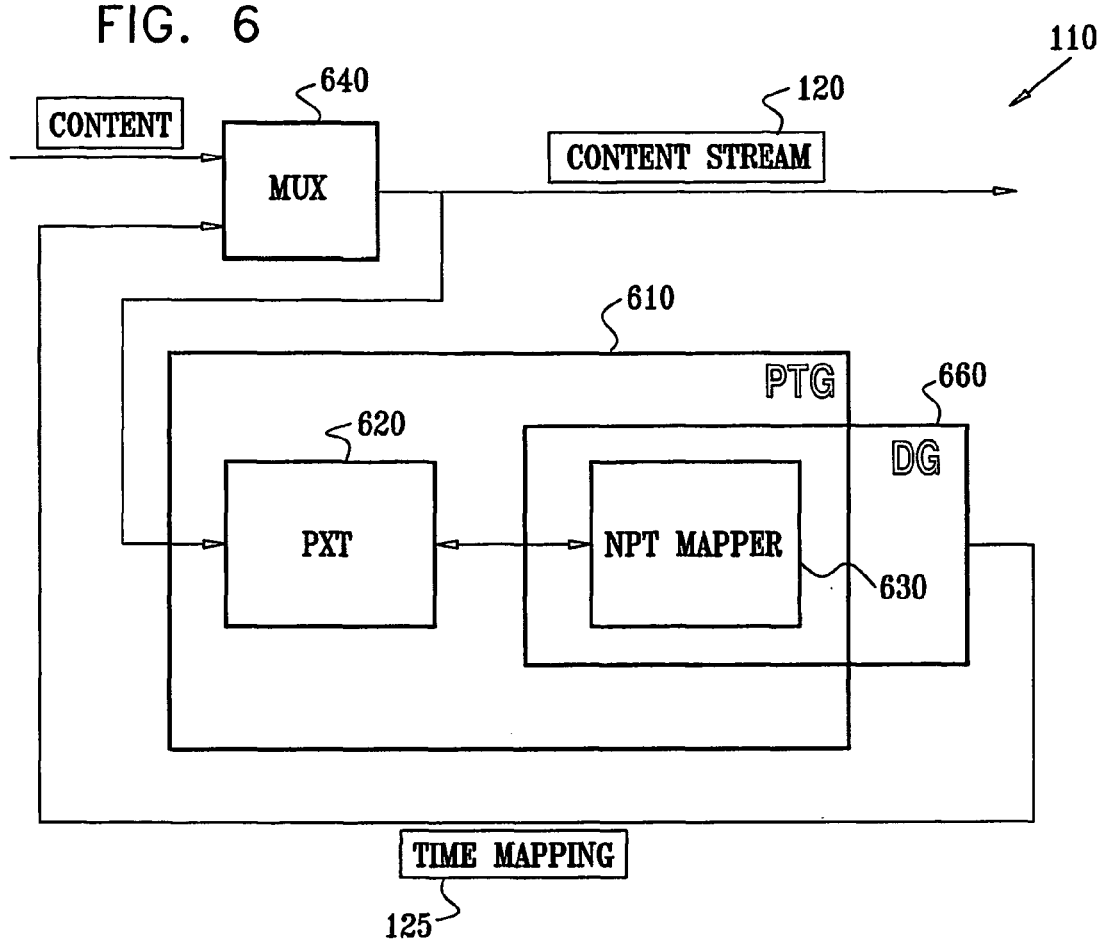
FIG. 6 is a simplified block diagram illustration of a preferred implementation of a portion of the system of FIG. 1.

Reference is now made to FIG. 6, which is a simplified block diagram illustration of a preferred implementation of a portion of the system of FIG. 1, comprising a preferred implementation of a portion of the headend 110 of FIG. 1. For the sake of simplicity of description, conventional components of the headend 110 are not shown; persons skilled in the art will appreciate how to include said conventional components.

The apparatus of FIG. 6 preferably comprises a play time generator (PTG) 610, which preferably comprises a PCR extraction unit (PXT) 620 and an NPT mapper 630. The PTG 610 is preferably implemented in an appropriate combination of hardware and software, as also described in more detail below.

The PTG 610 is preferably operative to produce the time mapping 125, which is encapsulated for inclusion in the content stream 120 by a Data Generator (DG) 660 (the DG 660 preferably but not necessarily comprising the NPT mapper 630) and multiplexed by a multiplexer (MUX) 640 together with content to produce an output content stream 120. The MUX 640 may comprise any appropriate multiplexer as is well known in the art.

Preferably, the PXT 620 and the NPT mapper 630 are synchronized to a common clock using any appropriate technique such as, for example, Network Time Protocol, which is well known in the art. Further preferably, the NPT mapper 630 receives real time playout triggers via the DG 660, the real time playout triggers indicating the start of NPT for a given event.

Persons skilled in the art will appreciate that, for more robust operation, a redundant version of the apparatus of FIG. 6 may preferably be provided.

The operation of the apparatus of FIG. 6 is now briefly described.

Figure 7:
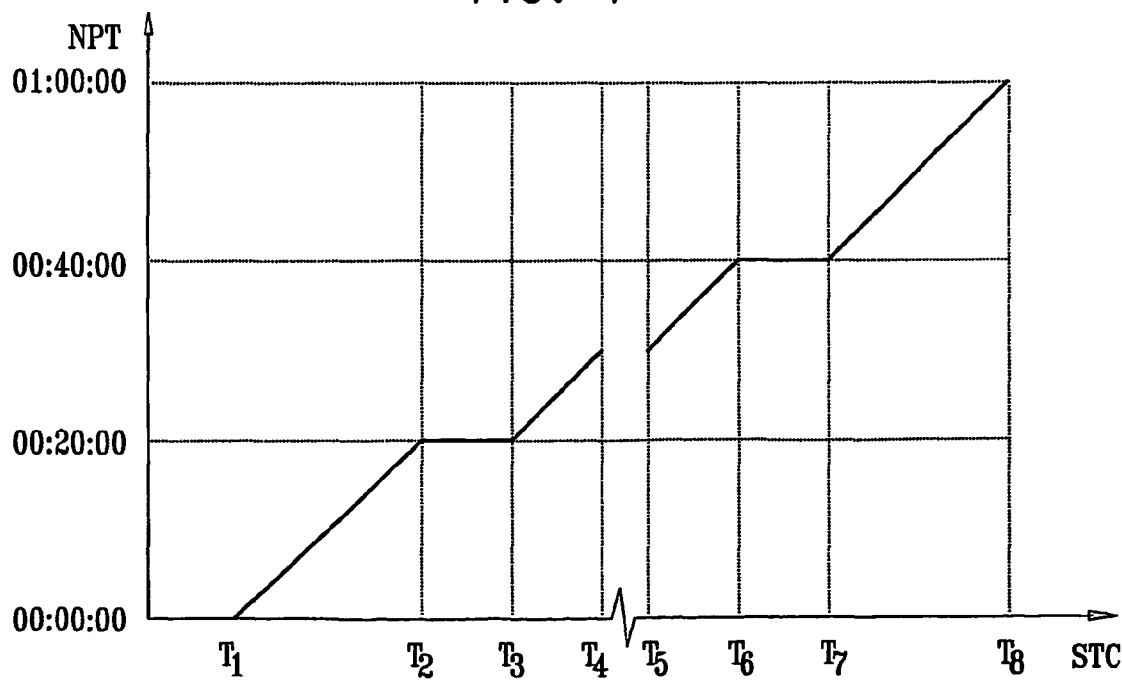
FIG. 7 is a graphical illustration of an example of time mapping, useful for understanding the apparatus of FIG. 6.

Reference is now additionally made to FIG. 7, which is a graphical illustration of an example of time mapping, useful for understanding the apparatus of FIG. 6. The graphical illustration of FIG. 7 illustrates the problem because of which the time mapping 125 is useful, as described above with reference to FIGS. 1 and 2, in preferred embodiments of the present invention.

FIG. 7 illustrates an example of Normal Play Time (NPT) against System Time Clock (STC) for a an example piece of content such as, for example, a fictitious documentary. It is appreciated that the particular example is chosen for simplicity and clarity of description, and that a real example might be considerably more complex.

The example of a mapping between the STC and NPT for a particular event given in FIG. 7 is used to illustrate the problems to be solved by the PTG 610. The example presented consists of a single piece of content that is paused twice and is subjected to an STC discontinuity.

The example of FIG. 7 represent a single program that lasts for a given period of time such as, for example, one hour. Further, it is decided that interstitial material such as advertisements will be inserted at 20 minutes and at 40 minutes into the program. When the program starts to be broadcast the STC clock takes the value T1; by convention, NPT is at 0. For the next 20 minutes the event continues to be broadcast until the STC clock reaches T2. Now the program is paused while advertisements are broadcast until the time when the STC reaches T3.

From STC values T3 to T4 the program is broadcast as normal but at T4 there is a PCR discontinuity and the value of STC therefore abruptly changes from T4 to T5; note that it is possible for T5 to be less than T4, although the case of T5 greater than T4 is shown in FIG. 7 for purposes of simplicity of depiction. The viewer should not perceive the discontinuity in the system clock, but the system, in particular the STB 130 of FIG. 1, needs to be aware of this discontinuity in order to properly handle the relationship between NPT and STC, as described above with reference to FIGS. 1 and 2. In effect the PCR discontinuity may appear to be similar to a program pause; this is because, when there is a pause, the NPT remains constant while STC advances, similar to the situation at a PCR discontinuity.

After the discontinuity at T5 the program continues as normal with the second interstitial break being reached at T6. At T6 the program is paused until the STC reaches T7, at which point the program continues to be broadcast until the end of the program is reached at T8.

It is appreciated that the example presented in FIG. 7 is not supposed to depict a typical program but is used to illustrate the goal of the PTG, to produce the time mapping 125 for use by the STB 130 of FIGS. 1 and 2.

Referring back to FIG. 6, the PXT 620 preferably includes an interface (not shown) to a content stream monitoring component (not shown) in the headend 110, the content stream monitoring component having direct access to the content stream 120 being produced in the headend 110.

The following particularly detailed description of a preferred method of operation of the PXT 620 is provided by way of example only, for use with MPEG-2 transport streams as defined in ISO/IEC 13818-1, and is not meant to be limiting. In the following particularly detailed description, the various flags which are referred to are MPEG-2 flags defined in ISO/IEC 13818-1, except as specified otherwise.

In reference to the following discussion, it is appreciated that the PXT 620 preferably only sends a new STCTimeEntry message to the NPT mapper 630 when the PXT 620 notices that there is a significant difference between the STC value expected in the next PCR and actual value received.

The preferred method of operation preferably comprises the following steps:

1. The content stream monitoring component is instructed to monitor the content stream 120. In effect this means that the content stream monitoring component provides buffers, preferably containing a fixed number of packets, on a regular basis.
2. The PXT 620 preferably sets the size of the buffer to correspond to the time it will take to capture approximately 100 milliseconds (msecs) of packets from the content stream 120; this is intended to minimize the delays incurred without overloading the content stream monitoring component.
3. A constant bit-rate is assumed for the content stream 120 so that after an initial sample of STC is taken the value of any subsequent sample of STC can be estimated based on the arrival time of the first sample and the elapsed time since the first sample; the elapsed time is known because the bit-rate is constant and the number of packets received since the initial sample can be counted. The time of arrival of the first sample is measured by a "non-relative" time base, such as, for example, real time; the example of real time is not meant to be limiting.
4. Reset a non-MPEG-2 flag, to be known as PCR_Discontinuity_Detected, used internally by the method, to FALSE.
5. The buffer supplied by the content stream monitoring component will contain a set of packets and include the arrival time of a known packet in the buffer. After the initial request the content stream monitoring component will continue to send buffers of packets captured every time the requested number of packets have been received until commanded to stop. In some preferred implementations of the present invention, each buffer typically has a size of approximately 5 megabits.
6. Wait for the delivery of a buffer full of the requested number of packets.
7. Examine the first packet in the buffer.

8. If the packet matches the PID of interest then the packet is checked for an adaptation field. If no adaptation field is found or the packets is not of the PID of interest, then go to Step 19.
9. In the adaptation field the PCR flag is checked to determine if it has been set, indicating the presence of a PCR. If the PCR flag has not been set then go to Step 19.
10. Check if the discontinuity indicator has been set. If it has not been set go to Step 16.
11. If the PCR_Discontinuity_Detected flag is FALSE then set the STC_Entry_Time parameter to the estimated arrival time of this packet and set the PCR_Discontinuity_Detected to TRUE.
12. Check the present packet for a PCR field and if it is not present go to Step 19.
13. Extract the STC value carried in the PCR field of this packet and estimate the arrival time of this packet as described in step 3 above.
14. Using the information from Step 13 estimate the STC_Entry_STC value at the time STC_Entry_Time and generate a STCTimeEntry message for the pair of values STC_Entry_STC and STC_Entry_Time.
15. Reset the algorithm flag PCR_Discontinuity_Detected to FALSE and go to Step 19.
16. Extract the STC from the packet and estimate the arrival time of this packet as described in Step 3 above.
17. Calculate the expected value for the STC based on the value from the last sample sent to NPT mapper 630, the time that has elapsed since that sample and the fact that the STC increments 90,000 ticks per second, at the resolution used in this preferred method. (Persons skilled in the art will appreciate that MPEG-2, in ISO/IEC 13818-1, referred to above, specifies STC as a 27 MHz clock and PCR as a sample of STC with 2 components: one component having a precision of 90 kHz, and a second component having a precision of 27 MHz. Preferably, the 90 kHz component is used in the this preferred method.)
18. If the expected value differs from the value extracted from the packet by more than a threshold value such as, for example, 558 ticks (that is, ¼ frame or 6.2 milliseconds), then generate a new STCTimeEntry message using the values associated with this packet
19. If there is another packet in the buffer then examine the next packet and go to Step 8
20. As there are no more packets in this buffer, go to Step 6

It is appreciated that it is possible that the PCR_discontinuity flag may be set in a packet that does not contain a PCR field. There maybe a series of packets that have the flag set before the next PCR is received; see ISO IEC 13818-1.

The following particularly detailed description of a preferred method of operation of the NPT mapper 630 is provided by way of example only and is not meant to be limiting.

The NPT mapper 630 preferably generates the time mapping 125, also referred to herein as a "mapping table", based on the information that the NPT mapper 630 receives from the PXT 620 and from the DG 660. The DG 660 preferably receives notification of the actual start time of the material being accessed in terms of the same "non-relative" time base that is used to record arrival times of packets by the PXT 620 in step 3 above.

The following assumptions are preferably made about the mapping tables produced by the NPT mapper 630:

1. Each mapping table covers a single piece of material being accessed and indexed, hereafter referred to as an "Event".

2. Each mapping table does not allow an item of content to extend beyond the end of the Event.

The DG 660 tells the NPT mapper 630 which Events require a mapping table to be generated. If a mapping table is required the DG 660 sends to the NPT mapper 630 a mapping id and the start time that have been assigned to the Event. The NPT mapper 630 uses the mapping id in creating the mapping table, as described below.

As the Event progresses specific items of content could start to run, be stopped and start again, as described above. The NPT mapper 630 is preferably informed by the DG 660 every time that an item of content starts or stops, since the NPT mapper 630 generates a new entry in the mapping table in each case. The NPT mapper 630 assumes that there are no items of content required to be mapped unless the DG 660 explicitly informs the NPT mapper 630 about an item of content to be mapped.

After the DG 660 has informed the NPT mapper 630 that an item of content starts at a specific time, the NPT mapper 630 maps that item of content for the duration of the remainder of the Event. An entry for the specific item of content is made in the mapping table every time the PXT 620 sends a new STCTimeEntry message, as described above, and also when the content starts or stops during the vent.

In certain preferred embodiments of the present invention, the entire mapping table is preferably sent repeatedly such as, for example, once every 10 sec. Furthermore, the entries in the mapping table are preferably ordered in the order in which they occur.

In certain preferred embodiments of the present invention, when an entry in the mapping table is to be generated there are preferably six fields recorded for each entry; it is appreciated that the present invention is not limited to the presence or absence of the six fields.

The first field, UTC time, corresponds to the actual real time of the entry, expressed in UTC time, UTC time being well known in the art.

The second field is an STC value directly extracted from the STCTimeEntry message received from the PXT 620. The STC value will correspond to a particular NPT value that is calculated based on the value of STC and arrival time in the STCTimeEntry message.

The STC value received from the PXT 620 is preferably adjusted by adding the "video_delay", the amount of time that a video frame is delayed in the encoding and multiplexing processes. This adjustment ensures that the STC value in each entry in the mapping table corresponds to the presentation time of the video frame that occurs at the corresponding NPT value.

The third field is the content id; this field is filled based on the information that the DG 660 supplies to the NPT mapper 630, and is used to distinguish between different NPT time lines in the same Event as defined in ISO/IEC 13818-6. The DG 660 preferably informs the NPT mapper 630 when an item of content starts and includes the content id that has been assigned to this item of content. The NPT mapper 630 uses the content id value to identify the piece of content to which the present entry applies.

The fourth field is the NPT field; the NPT field is used to indicate the amount of time that an item of content has been running.

In order for the STB 130 of FIGS. 1 and 2 to be aware when an item of content starts or stops a fifth field, the "Content Running Status" field, is preferably included for every entry. This Content Running Status field is used to indicate whether the particular item of content continues to run from this point onwards or whether it stops; it is possible that an item of content may start and stop a number of times during the Event so setting this flag is important. Although the Content Running Status field might appear to be superfluous because it might be argued that a new entry in the table is required only if an item of content stops or starts, it is appreciated that entries might be desirable or required without the content stopping or starting; such entries are used, for example, when there is a PCR discontinuity and when the PXT 620 notices an inaccuracy in the mapping that requires a new entry to be generated.

The sixth and last field is the PCR Discontinuity field, which is preferably included in order to signal instances of PCR discontinuity to the STB 130 of FIGS. 1 and 2. A PCR discontinuity is signaled in the STCTimeEntry message from the PXT 620; for every entry in the mapping table that corresponds to a STCTimeEntry the status of the PCR Discontinuity flag must be recorded as the last field of the entry in the mapping table.

The mapping table (time mapping 125) is preferably delivered as soon as possible to the STB 130 of FIGS. 1 and 2; therefore, a new version of the time mapping 125 is preferably transmitted every time a new set of entries are added to the table. A new set of entries is preferably generated when either a new STCTimeEntry message is received from the PXT 620; or when an item of content either starts or stops. When the SI Event ends a complete version of the mapping table for the SI event can be stored and used when the Event is played back.

As there can be different mapping tables for different events it is preferable to provide a means of differentiating between each mapping table; this differentiation is preferably accomplished via mapping id.

In some preferred embodiments of the present invention the mapping table for each Event is carried on a separate table_id extension. The mapping id value is used to set the table_id_extension value of an MPEG-2 private section that will be used for this particular mapping table. Such preferred embodiments may be used, for example, in a case in which the STB 130 of FIGS. 1 and 2 is intended for use with the NDS Core system, commercially available from NDS Limited, One London Road, Staines, Middlesex TW18 4EX, United Kingdom.

In other preferred embodiments of the present invention, particularly those in which the STB 130 of FIGS. 1 and 2 is intended for use with the commercially-available OpenTV system (commercially available from OpenTV; see www.opentv.com), the mapping id will be used to set the application id that will be used for the modules that are produced. In effect, in these preferred embodiments, the STB 130 of FIGS. 1 and 2 will look for the same table but on a different carousel for each Event.

The mapping table also preferably conveys a constant value called video_delay for the Event. The video_delay is a value that describes the total delay between a video frame entering the encoder and appearing in the output of the final multiplexer. It is assumed that the video delay is independent of the content used and that it only depends on the route the signal took through the equipment. If, for example, a redundancy switch occurs and the signal is routed through different equipment the video_delay value for the content may change.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for accessing a desired access point in time-synchronized data within a time-synchronized data stream, the time-synchronized data stream being associated with time information, the method comprising:

providing a desired presentation time associated with a desired point within the time-synchronized data stream;

finding a stream access point, comprising:

finding a beginning time after which the desired point is likely to be found; and assigning the stream access point to be a first point, at or after the beginning time, at which decoding of the time-synchronized data stream is available;

examining the time information associated with the time-synchronized data stream, beginning at the stream access point; and continuing to examine the time information associated with the time-synchronized data stream, at least one additional stream access point, until a last access point at which the time information associated with the time-synchronized data stream corresponds to a time less than or equal to the desired presentation time is found; and assigning the desired access point to be the last access point.

2. The method according to claim 1 and wherein the time-synchronized data stream comprises a stored time-synchronized data stream.

3. The method according to claim 1 and wherein the desired point comprises a desired frame.

4. The method according to claim 3 and also comprising:

utilizing the stream beginning at the desired presentation time.

5. The method according to claim 4 and wherein the utilizing comprises making the stream sensible to at least one human sense.

6. The method according to claim 4 and wherein the utilizing comprises displaying the stream.

7. The method according to claim 4 and wherein the utilizing comprises utilizing the stream other than by making the stream sensible to at least one human sense.

8. The method according to claim 4 and wherein the utilizing comprises performing a splicing process.

9. The method according to claim 4 and wherein the utilizing comprises performing a storing process.

10. The method according to claim 1 and wherein said point at which decoding of the time-synchronized data stream is available comprises a point at which efficient decoding of the time-synchronized data stream is available.

11. The method according to claim 10 and wherein the point at which efficient decoding of the time-synchronized data stream is available comprises a key frame.

12. The method according to claim 11 and wherein the time-synchronized data stream comprises an MPEG-2 stream and the key frame comprises an I-frame.

13. The method according to claim 1 and wherein the beginning time is determined, at least in part, according to a presentation time of a desired frame.

14. The method according to claim 13 and wherein the stream comprises an MPEG-2 stream and the beginning time is within 1 second plus GOP duration of the MPEG-2 PTS value of the desired frame.

15. The method according to claim 1 and wherein the beginning time is between approximately 0.7 and approximately 1.2 seconds before the desired presentation time.

16. The method according to claim 15 and wherein the desired presentation time comprises a normal play time indication.

17. The method according to claim 16 and wherein the finding a stream access point comprises mapping the normal play time indication to a corresponding presentation time stamp.

18. The method according to claim 1 and wherein the utilization time comprises a presentation time stamp.

19. The method according to claim 18 and wherein the stream comprises an MPEG-2 stream and the presentation time stamp comprises MPEG-2 PTS.

20. The method according to claim 16 and wherein the finding a stream access point comprises utilizing an access point index.

21. The method according to claim 20 and wherein the access point index comprises a heuristic index.

22. The method according to claim 20 and wherein the access point index comprises a RASP index.

23. The method according to claim 1 and wherein the time-synchronized data stream comprises an MPEG-2 stream.

24. The method according to claim 1 and wherein the time-synchronized data stream comprises an encrypted stream, and the method also comprises:
decrypting the encrypted stream.

25. The method according to claim 1 and wherein the time-synchronized data comprises audio and/or video data.

26. The method according to claim 1 and wherein the time-synchronized data comprises interactive television data.

27. A data stream accessor for accessing a desired access point in time-synchronized data within a time-synchronized data stream, the time-synchronized data stream being associated with time information, the data stream accessor comprising:
a stream access point finder receiving a desired presentation time associated with a desired point within the time-synchronized data stream and finding a stream access point, the finding including:
finding a beginning time after which the desired point is likely to be found; and
assigning the stream access point to be a first point, at or after the beginning time, at which decoding of the time-synchronized data stream is available; and
a time examiner operative to examine the time information associated with the time-synchronized data stream, beginning at the stream access point, and to continue to examine the time information associated with the time-synchronized data stream, at least one additional stream access point, until a last access point at which the time information associated with the time-synchronized data stream corresponds to a time less than or equal to the desired presentation time is found, and to assign the desired access point to be the last access point.

28. A data stream accessor for accessing a desired access point in time-synchronized data within a time-synchronized data stream, the time-synchronized data stream being associated with time information, the data stream accessor comprising:
means for providing a desired presentation time associated with a desired point within the time-synchronized data stream;
means for finding a stream access point, the finding including:
finding a beginning time after which the desired point is likely to be found; and
assigning the stream access point to be a first point, at or after the beginning time, at which decoding of the time-synchronized data stream is available; and
means for examining the time information associated with the time-synchronized data stream, beginning at the stream access point, and for continuing to examine the time information associated with the time-synchronized data stream, at least one additional stream access point, until a last access point at which the time information associated with the time-synchronized data stream corresponds to a time less than or equal to the desired presentation time is found, and for assigning the desired access point to be the last access point.

29. The method according to claim 1, wherein the desired presentation time is expressed as a normal play time (NPT) indication.

30. The method according to claim 29, wherein the finding a stream access point also comprises mapping the NPT indication to a corresponding presentation time stamp (PTS).

31. The method according to claim 1, wherein the beginning time is expressed as a program clock reference (PCR).

32. The method according to claim 1, wherein the desired presentation time is expressed as a presentation time stamp (PTS) and the beginning time is expressed as a program clock reference (PCR).

33. A method for finding a near access point near a desired point in time-synchronized encoded data within a time-synchronized encoded data stream, the time-synchronized encoded data stream being associated with time information, the method comprising:
providing a desired presentation time associated with a desired point within the time-synchronized encoded data stream;
providing an index to a plurality of points in the time-synchronized encoded data stream, the index including time information regarding the points, measured in a time measurement other than presentation time;
computing a beginning time, expressed in the time measurement other than presentation time, which is a beginning of a time window in which the desired point is likely to be found;
using the index to find a first stream access point which is a point in the time-synchronized encoded data stream, near the beginning time, at which decoding of the time-synchronized encoded data stream is available;
examining presentation time stamps associated with access points within the time-synchronized encoded data stream, starting at the first stream access point and continuing with at least one additional stream access point, until a last stream access point whose presentation time stamp corresponds to a time less than or equal to the desired presentation time is found; and
assigning the near access point to be the last access point.

34. The method according to claim 33, wherein the time measurement other than presentation time comprises arrival time.

35. The method according to claim 33, wherein the time-synchronized encoded data stream comprises an MPEG-2 data stream, and the time measurement other than presentation time comprises Program Clock Reference (PCR).

36. The method according to claim 33, wherein the point in the time-synchronized encoded data stream near the beginning time comprises a first point, at or after the beginning time, at which decoding of the time-synchronized encoded stream is available.

37. The method according to claim 33, wherein the point in the data stream near the beginning time comprises a point, nearest to the beginning time, at which decoding of the time-synchronized encoded stream is available.

38. The method according to claim 33, wherein the index comprises a heuristic index.

* * * * *

UNITED STATES PATENT AND TRADEMARK OFFICE
CERTIFICATE OF CORRECTION

| | |
|---|---|
| PATENT NO. | : 7,756,201 B2 |
| APPLICATION NO. | : 10/479373 |
| DATED | : July 13, 2010 |
| INVENTOR(S) | : Darshan et al. |

It is certified that error appears in the above-identified patent and that said Letters Patent is hereby corrected as shown below:

In claim 1 (column 20, line 23), insert --at-- between "data stream," and "at least one";

In claim 27 (column 21, line 52), insert --at-- between "data stream," and "at least one";

In claim 28 (column 22, line 10), insert --at-- between "data stream," and "at least one".

Signed and Sealed this

Fourteenth Day of September, 2010

David J. Kappos
*Director of the United States Patent and Trademark Office*